United States Patent [19]

Krauss

[11] Patent Number: 4,989,380

[45] Date of Patent: Feb. 5, 1991

[54] SILO FOR PULVERULENT AND FINE-GRAINED BULK MATERIALS

[75] Inventor: Werner Krauss, Hamburg, Fed. Rep. of Germany

[73] Assignee: Ibau Hamburg Ingenieurgeselllschaft Industriebau mbH, Hamburg, Fed. Rep. of Germany

[21] Appl. No.: 268,256

[22] Filed: Nov. 7, 1988

[30] Foreign Application Priority Data

Jul. 28, 1988 [EP] European Pat. Off. ........ 88112178.4

[51] Int. Cl.[5] .......................... B65G 65/40; E04H 7/00

[52] U.S. Cl. .......................................... 52/197; 222/564

[58] Field of Search .................. 52/192, 198, 245, 193, 52/194–197; 222/547, 564; 414/298, 299

[56] References Cited

U.S. PATENT DOCUMENTS

| | | | |
|---|---|---|---|
| 3,976,232 | 8/1976 | Heidebroek | 52/197 |
| 4,382,723 | 5/1983 | Möller | 222/564 X |
| 4,539,782 | 9/1985 | Ahrens et al. | 52/192 |
| 4,566,232 | 1/1986 | Klein-Albenbausen | 52/195 |
| 4,606,158 | 8/1986 | Krauss | 52/192 |
| 4,671,030 | 6/1987 | Krauss | 52/197 |

*Primary Examiner*—John E. Murtagh
*Attorney, Agent, or Firm*—Staas & Halsey

[57] ABSTRACT

A silo for pulverulent and other loose materials has outer silo walls, a lower circular silo base, a conical cover in the center of the lower circular silo base, and an upper intermediate circular silo base arranged between the outer silo wall and the conical cover and above the lower circular silo base. An annular space is formed between the upper and lower silo bases to act as a collecting chamber for receiving loosened material from the silo upper storage area and collecting and feeding the lossened material to discharge outlets in the lower silo base. The loose material passes via radially directed slots formed in the intermediate silo base from the upper silo area into the collecting chamber. The slots are adustable and pneumatic mechanisms are located adjacent the slots for fluidizing and ensuring proper mass flow of the materials from the upper silo area into the collecting chamber. Outlets are located in the lower silo base for discharge of loosened material held in the outlet chamber.

18 Claims, 9 Drawing Sheets

SILO FOR PULVERULENT AND FINE-GRAINED BULK MATERIALS

BACKGROUND OF THE INVENTION

The invention relates to a silo for pulverulent and finegrained bulk and other loose materials having a conical cover in the center of a circular silo base, the base being provided with pneumatic fluidizing means and being slightly inclined towards material outlets formed therein.

Such silos or hoppers, e.g., are used for the storage of raw flour, cement, fly ash, coal dust and gypsum. Known material emptying or discharging means for silos of this type are described in German publications DE-AS 23 52 455 and DE-AS 25 47 667. Such silos are centrally provided with a conical silo base along which the sinking loose material slides into the outer ring base zone. The circular silo base between the central cone and the silo outer wall is inclined towards the particular outlet openings and is provided with material loosening mechanisms. An outflow towards the outlet openings takes place through venting the loose material in the base zone.

Unfortunately, the venting only takes place in a very incomplete manner. As a result of the high compression pressure of the complete loose material column in the silo, the material is compressed to such an extent that the loosening air on the silo base only acts in the immediate vicinity of the outlet openings. As the air cannot escape upwards through the loose material in the silo, the entire loosening air quantity must escape through the outlet openings together with the loose material.

During the emptying or discharging process, the loose material column immediately above the outlet opening is subject to movement. This column assumes a gradually enlarging funnel shape upwards towards the loose material level. Therefore, there are dead silo zones not participating in the movement and this material is very strongly compressed and formed into lumps over a long period, sometimes several years. If it is necessary to almost completely empty a silo, i.e. the loose material level is moved further downwards, then from the previously passive silo zones there gradually is a detachment of the loose material layers, which then approach the outlet zone generally in the form of lumps. This lumping action contributes to the clogging of the outlet zone.

The very complicated arrangement of a plurality of outlet connections with connected material dosing means is also unable to prevent the phenomenon of passive silo zones.

Furthermore, German utility model publication 75 23 514 discloses a container base for silos of the present type, which has a plurality of pneumatic feed channels passing from the circumference to the material outlet and which subdivide the container into sector-like portions. Over each pneumatic feed channel is provided a ventilatable cover inclined towards the outer circumference of the container base. This measure is intended to prevent material sinking difficulties and provide a uniform sinking of the material column during discharge from the silo. However, this can only take place in a very small area, namely in the immediate influence area of the feed channels or the ventilatable cover positioned above them.

A primary object of the present invention is to provide a silo of the aforementioned type, in which the loose materials stored in the silo uniformly drop downwards in the form of a "mass flow", i.e. uniformly over the silo cross-section, thus preventing dead or passive zones in the silo.

To achieve this object of the invention, a second or upper circular silo base is located at a distance above the lower circular silo base between the conical cover and the silo outer wall for forming a separate material collecting chamber. A plurality of radially positioned slots are formed in the upper silo base and fluidizing means are provided adjacent thereto. The annular space forming the collecting chamber is connected beneath the upper base with a venting line.

Advantageously, the cross-sections of the slots of the upper silo base are regulatable, i.e. adjustable from zero to a maximum desired cross-section, so as to directly influence the "mass-flow" of the material from the upper silo storage area into the material collecting or outlet chamber.

For all the surface areas of the silo base and because of the plurality of radially arranged slots, there is the same pressure loss for the fluidizing layer activated on the base. The vertically directed mass flow can uniformly act and be collected in the underlying outlet chamber. Only limited air pulses with a fraction of the energy are required compared with the conventional silo pneumatic material emptying means. The slots in the upper base take over the function of indirect silo outlets and transfer the loose material over the shortest route with the minimum pressure loss into the material outlet chamber.

Surprisingly, the material outlet chamber is not overfilled even during the loosening pulses on the upper silo base above it. Moreover, by covering the slots and/or using fittings inhibiting the vertical loose material flow, resistances are provided which intensely support the ventilating of the loose material in the frictional resistance process, particularly after the end of the brief pulsed ventilation and consequently prevent an afterflow into the outlet chamber. The chamber volume is dimensioned in such a way that there is an adequate capacity. Preferably the chamber volume is 2.5 to 5% of the total volume of the silo.

The ventilation of the chamber ensures a pressure compensation to the free silo upper area. As the relief paths of the loosened bulk material on the upper ring silo base are the same for all surface areas and are extremely short due to the slot arrangement with limited spacing intervals, it is sufficient, e.g., for cement loosening to release the frictional engagement of the stored material with compressed air having a pressure difference of only 200 to 300 mbar.

Conventional silo material emptying means, in which the loose material must cover longer horizontal flow paths to the constricted silo material outlet, make it necessary to design the compressed air means with a pressure differences of 400 to 800 mbar.

Recently, there have even been material emptying systems which operate with pressure differences up to 7.5 bar for loosening in storage silos, cf. the journal Zement Kalk Gips, No. 11/86, where on pp 596/7 a silo with a diameter of 18 meters is described for cement.

The considerable higher energy requirements result from the previously described strong and in particular unequal loose material densities in different silo zones. It is known in connection with loose materials that in the case of long storage periods, i.e. several months or years, unequal loose material densities on the silo base cannot be broken up even with increased pressure energy. These prior art disadvantages are eliminated by the invention because there is achieved a surface-equal material mass flow.

A further advantage of the invention is the improvement to the quality of the stored loose material through the increased mass exchange within the mass flow funnels produced. Whereas in the case of through-flow mixing silos according to German publication DE-AS 23 52 455/25 47 667, the mixing funnels produced comprise a long, narrow funnel neck and a funnel "tulip: located in the material level, the mass flow funnels are comparable with an inverted frustum shape. The action of the silo base surface extends over the actual surface area of the material loosening section. Through the changing venting of the material loosening sections and the described spatial extension of the mass flow funnels during material removal, intermeshing flow profiles act over the entire silo content. Unlike in the known silo types, strong composition fluctuations cannot break through to the lower silo base outlet and are instead dampened. The upper silo base therefore constitutes the actual operational base for the described advantageous process sequence. Material loosening appropriately takes place through use air troughs adjacent the radially arranged slots of the upper silo base.

Domes or slopes which are arranged above the slots of the upper silo base can prevent a short-circuit feed into the outlet chamber, because the unventilated material, compressed by support on the silo wall and base, is unable to convert inoperative frictional resistance forces into horizontal forces. Moreover, the outlet chamber is permanently vented, unlike the silo sections above the upper base.

It is also advantageous to provide additional fittings for the upper silo base inhibiting the loose material flow. These fittings are directly incorporated into the slots of the upper base. It is possible to use air feed troughs, loosening pipes and pivotable baffle plates. As a function of the operating state, the through-flow resistances can be increased or decreased. The cross-sections of the slots are so constructed that blockages are avoided. In the case of concrete bases, the slots are widened downwards. However, this can be avoided with steel structures.

In the case of a corresponding construction having baffle plates, they can also be used for closing the upper base. Therefore, if necessary the outlet chamber can be inspected even when the upper silo storage area is filled.

It is also conceivable for certain loose materials and silo sizes to cover the slots directly by a corresponding arrangement of the air feed troughs provided on the upper base.

For loose materials with good flow characteristics and advantageous storage conditions, the loosening surface of the upper base can also be halved, in that slopes in the form of concrete slides alternate with the loosening sections. In an advantageous construction, they cover the slots.

Generally, it is only necessary to energize one loosening section on the upper base by means of a short air pulse. The pulse time cycle is a function of the level of the quantity flow taken from the silo, as well as the flow behavior of the loose material. The filling state of the outlet chamber is indicated by the counterpressure in the ventilation system and can consequently be used in a simple manner as a control.

The construction of the silo base in accordance with the invention makes it possible to reduce to a minimum the costs for concrete. Merely through drawing in the upper base, an outlet chamber is formed with no significant additional costs compared with the complex system and other arrangements of the comparable prior art.

The simple operation of the silo mass flow material emptying means is characterized by only two silo outlet connections with corresponding material blocking and dosing means, independently of the size of the silo diameter.

The connection feed can take place directly from these silo outlets, because the outlet chamber simultaneously fulfills a material collecting and distributing function. In the case of a silo construction according to German publication DE-AS 25 47 667, behind the silo outlet connection is arranged an additional material container with further material dosing means for distribution over connecting feeds.

BRIEF DESCRIPTION OF THE DRAWINGS

The invention is described in greater detail hereinafter relative to several embodiments, wherein the drawings, are as follows.

DESCRIPTION OF THE PREFERRED EMBODIMENTS

Figure 1:
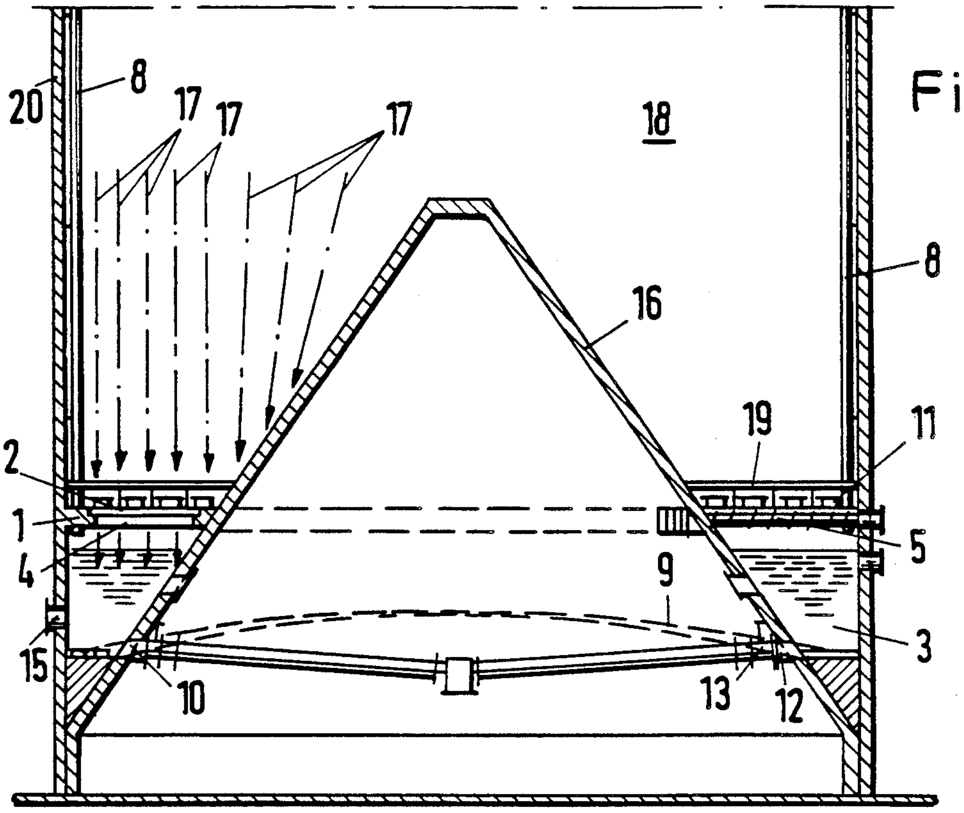
FIG. 1 is a cross-sectional view through the bottom area of a first preferred embodiment of a silo according to the invention.

FIG. 1 illustrates the lower portion of a silo in accordance with a first preferred embodiment of the invention. As shown therein, a silo area 18 is bounded by a circular silo wall 20. A silo base has a centrally arranged cone or conical cover 16 and a lower circular silo base 9. A second or upper, intermediate silo base 1 is positioned a short distance above the lower base 9 for forming an annular space or chamber 3 therebetween.

Base 1 is circular and provided with radially arranged elongated hole-shaped outlet slots 2 through which bulk or loose material passes from the upper portion of the silo 18 into the chamber 3. Annular space 3 acts as an intermediate collecting and distributing chamber for the loosened material to be discharged through the lower silo base 9.

Figure 2:
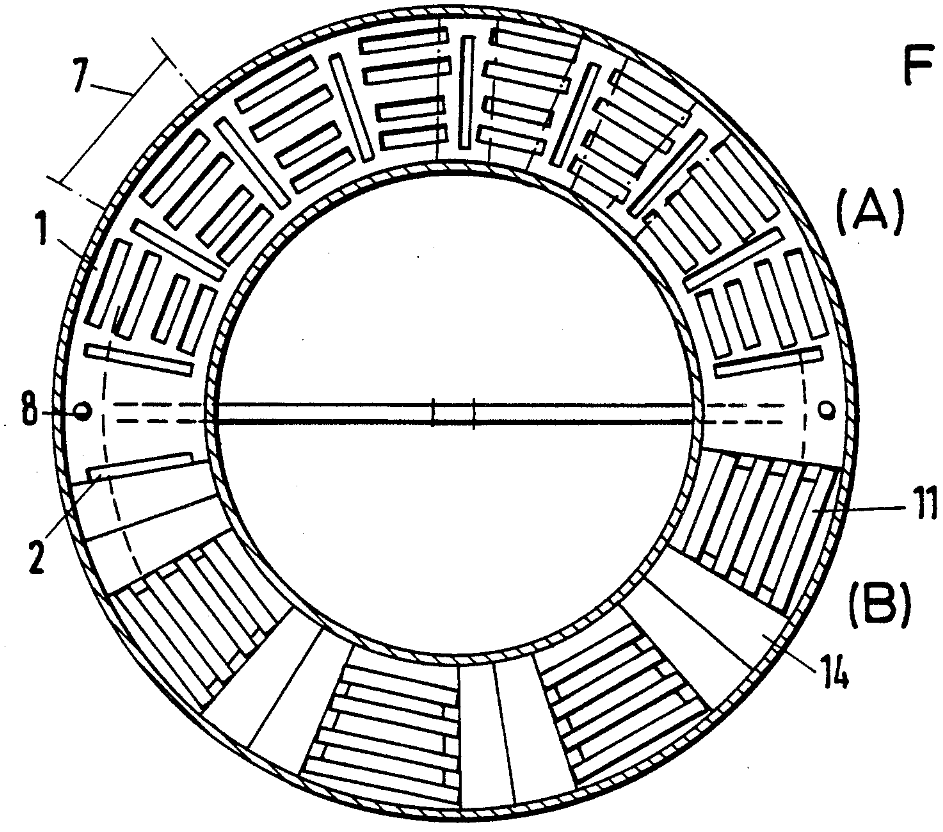
FIG. 2 is a horizontal sectional view of the silo of FIG. 1 above the second or upper silo base.

The flowability of the pulverulent or loose material is influenced by varying the density or loosening state into chamber 3, e.g. venting or ventilating the sections 7 using air feed troughs 11, as shown in FIGS. 1 and 2. The very narrow, ring channel-like silo base 9 is provided with air feed troughs 10, which are inclined to outlet connections 12 and adjacent material retention and discharge means 13.

Figure 3:
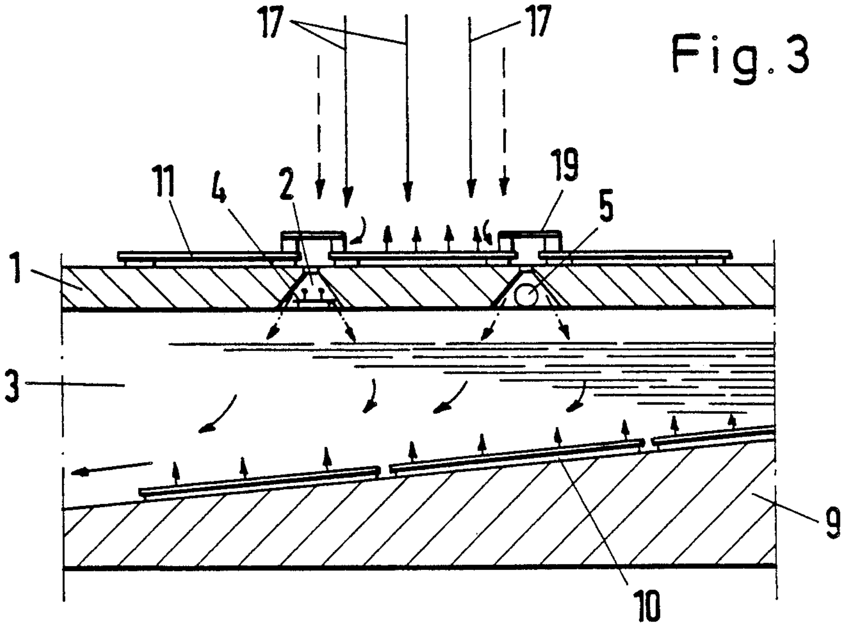
FIG. 3 is a vertical partial cross-sectional view of the silo of FIG. 1 through the slots arranged in the second or upper silo base and with corresponding barriers.

In the embodiment according to FIGS. 1 and 3, cover plates 19 are located above the radial outlet slots 2 formed in the upper base 1.

For the purpose of covering the outlet slots 2 and in another embodiment as shown from the lower half of the horizontal sectional view of FIG. 2, it is possible to use the air feed troughs 11 located on base 1. For venting purposes, the outlet chamber 3 is connected by pipes 8 to the silo upper area.

Figure 4:
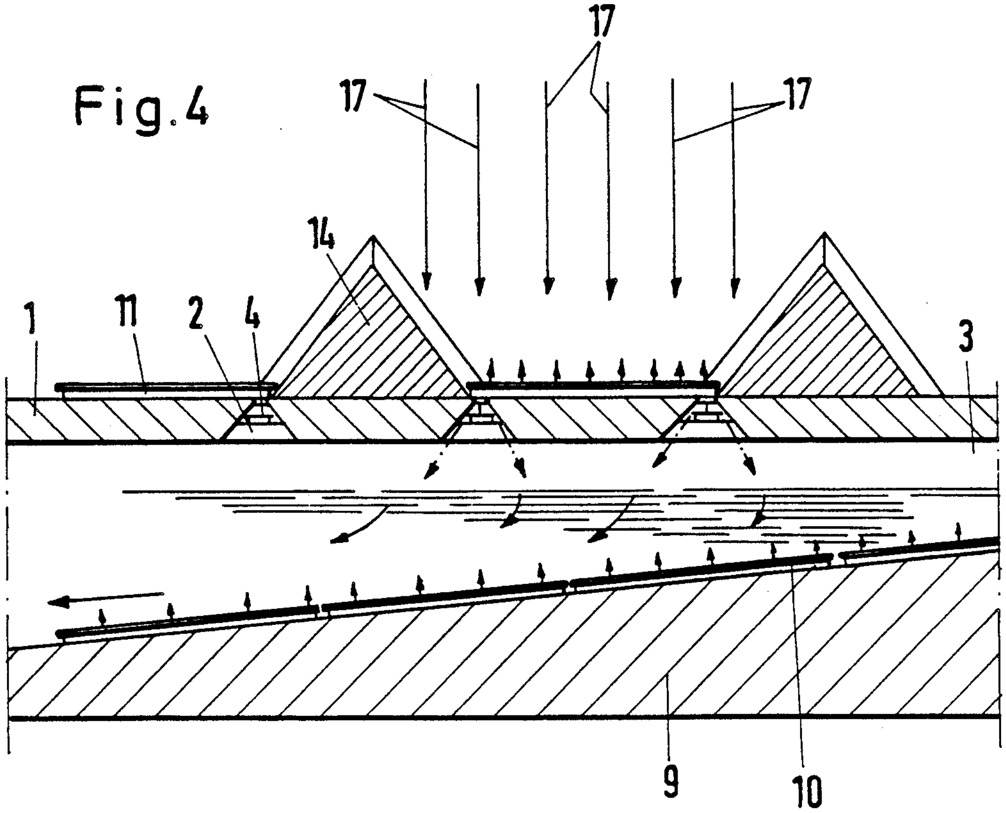
FIG. 4 is a cross-sectional similar corresponding to FIG. 3, but showing slope mechanisms between the slots in the upper silo base as an alternative construction.

As shown in FIGS. 3 and 4 and for influencing the material mass flow illustrated by the arrows 17, it is possible to additionally incorporate into the outlet slots 2 air feed troughs 4 or rotary loosening pipes 5.

For the embodiments of the invention shown in FIGS. 1 through 4, the internal cross-sections of the outlet slots 2 formed in base 1 are characterized by a very limited width, a relatively greater length and in vertical cross-section a downwardly directed, conical extension.

On reducing the material loosening circumference, e.g. the air feed troughs 11 on base 1, it is possible to arrange fixed slopes 14 in alternating manner between the individual outlet slots 2.

Figure 5:
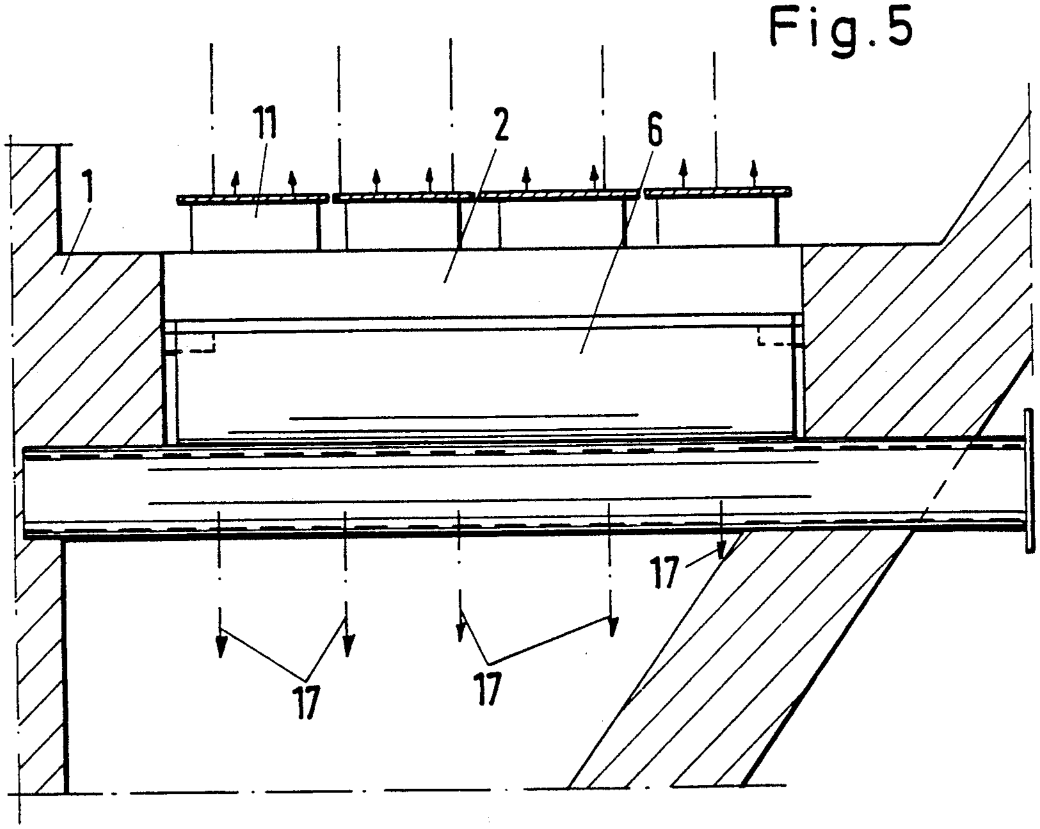
FIG. 5 is a radial sectional view of the silo of FIG. 1 through the second or upper silo base level and illustrating the base with a slot.
Figure 6:
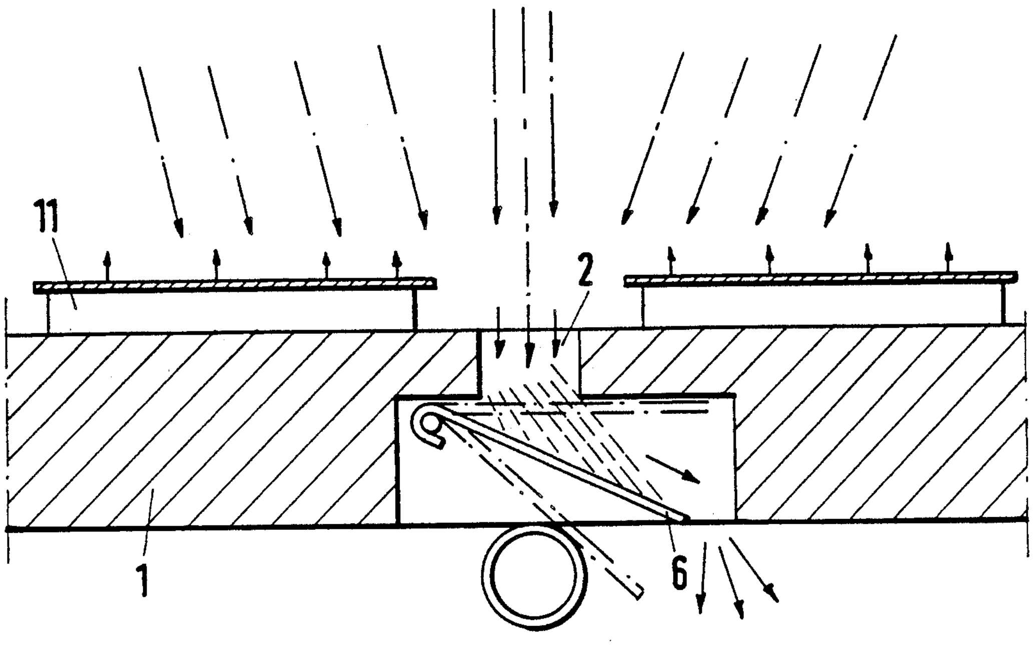
FIG. 6 is a horizontal cross-sectional view through a slot in the second or upper silo base and illustrating an adjustable baffle plate used therewith.

In another embodiment according to FIGS. 5 and 6, the outlet slots 2 are also widened downwards and can be covered from the bottom by adjustable baffle plates 6.

Figure 7:
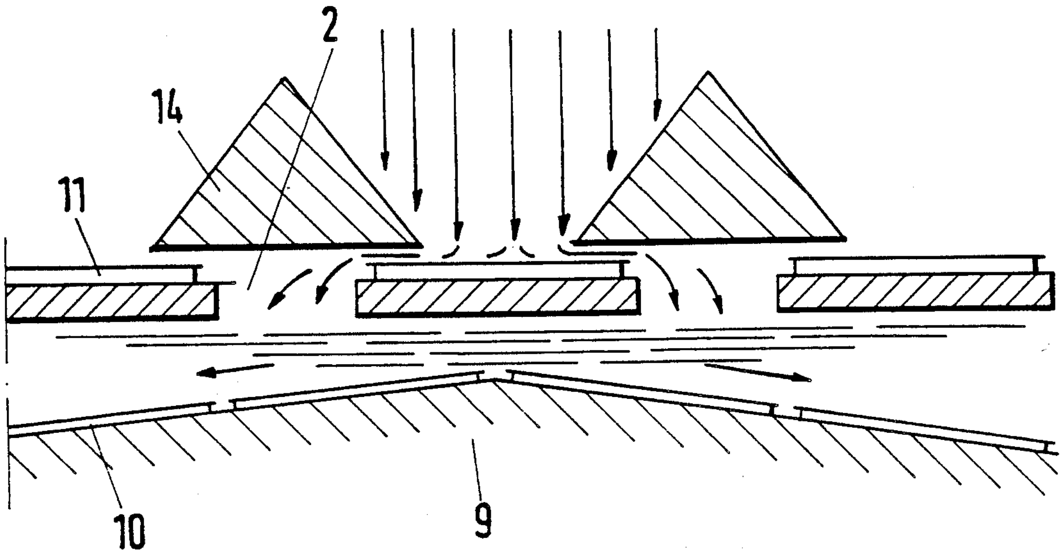
FIG. 7 is a vertical sectional view in the circumferential direction through the two superimposed silo bases with slope mechanisms arranged over comparatively wide slots, the slots having no additional barriers.
Figure 8:
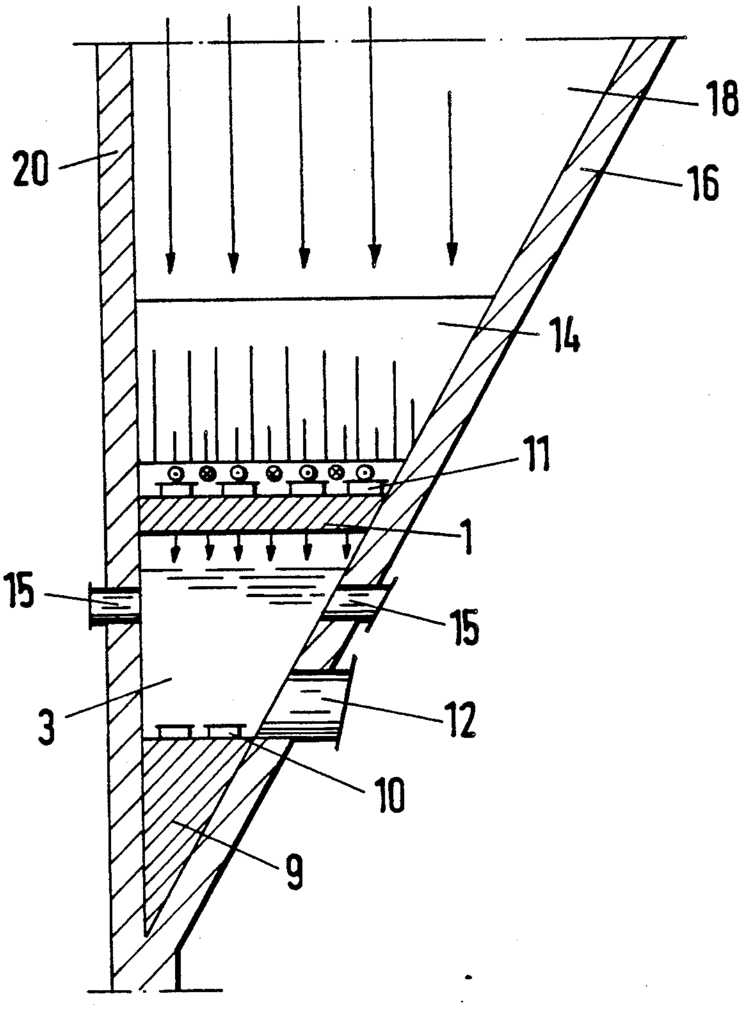
FIG. 8 is a vertical, radial sectional view through the superimposed silo bases with an outlet and a slope in side view above a slot.
Figure 9:
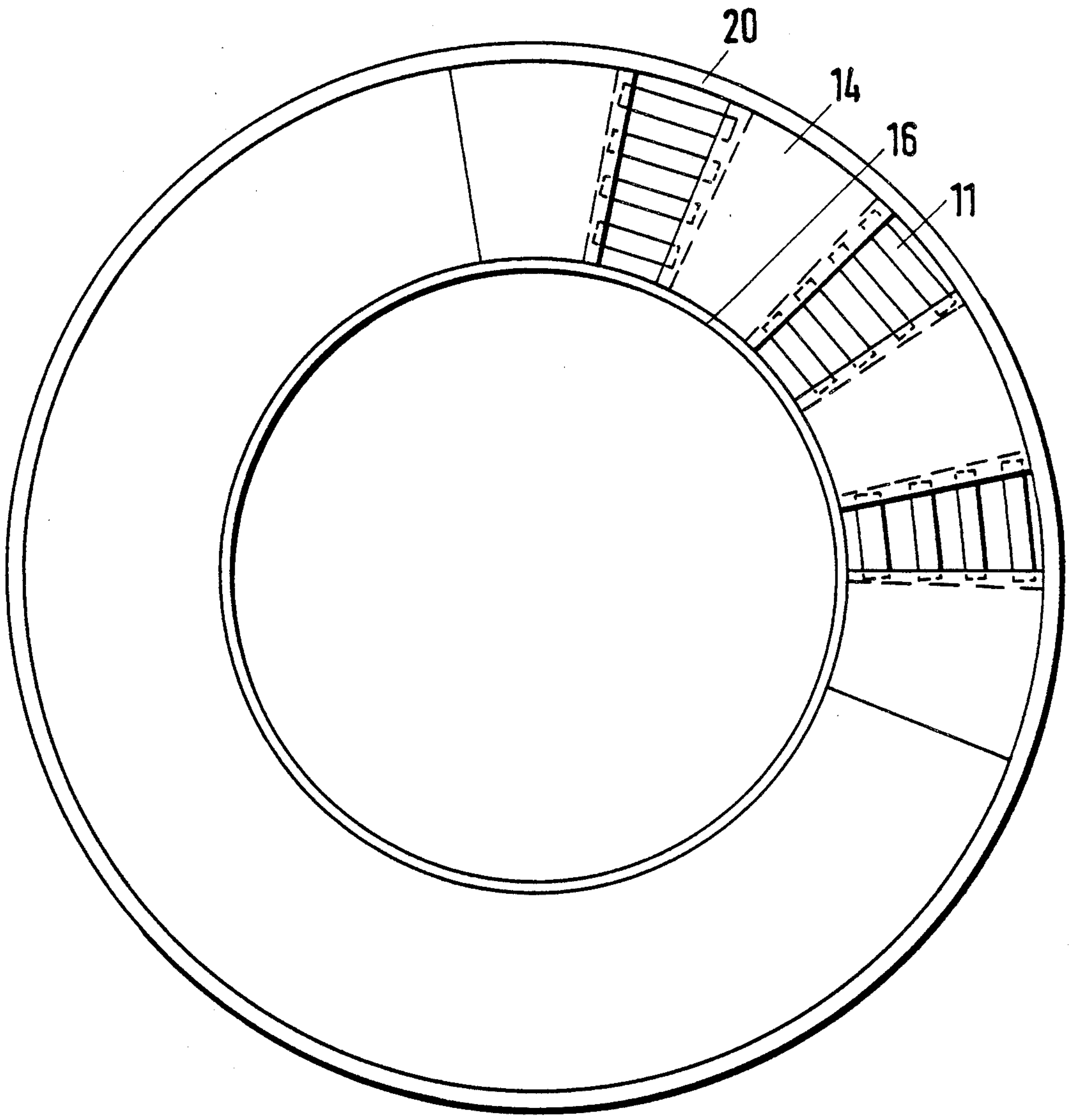
FIG. 9 is a horizontal sectional view above the second or upper silo base with alternately arranged material loosening sections and slope or concrete slide mechanisms covering the slots.

As shown in FIGS. 7 and 8, another type of controlled material mass flow is obtained by a comparatively large internal width of the outlet slots 2, while covering elements for the slots 2 are constructed in the form of slopes or concrete slides 14.

The covering of the air feed troughs 11 by slopes 14 can easily be achieved in that the residual slopes in the loose material remaining towards the end of the material loosening action do not reach the outflow edges of the outlet slots 2.

An inspection of the outlet chamber 3 is made possible by the safety inspection means 15 formed in silo outer wall 20 and/or conical portion 16 according to FIGS. 1 and 8.

Another preferred embodiment of the invention according to FIGS. 10 to 14 is fundamentally constructed in the same way as the embodiment according to FIG. 1. Therefore, the same parts are given the same reference numerals.

Figure 10:
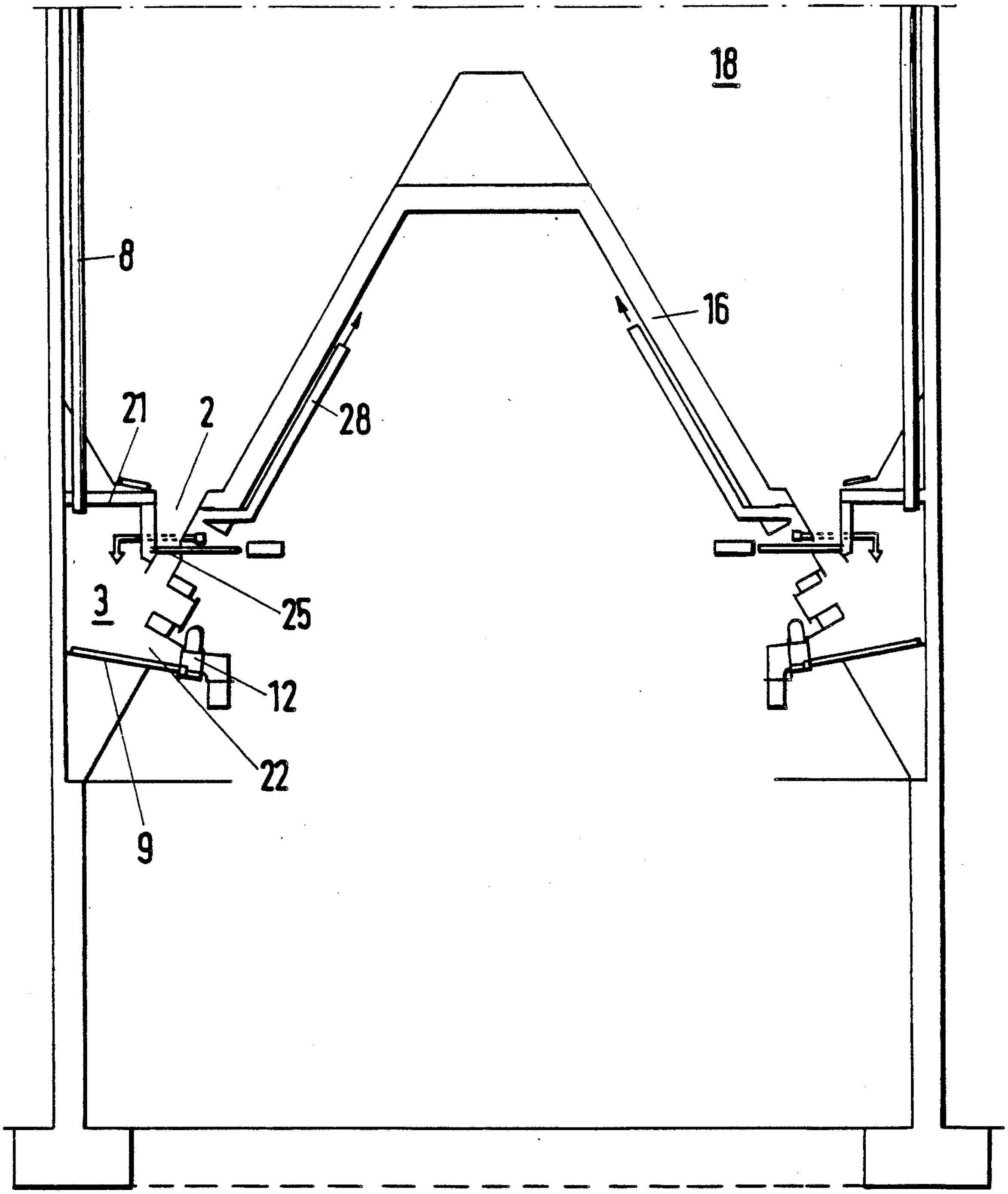
FIG. 10 is a cross-sectional view, similar to FIG. 1, of another preferred embodiment of a silo according to the invention.
Figure 11:
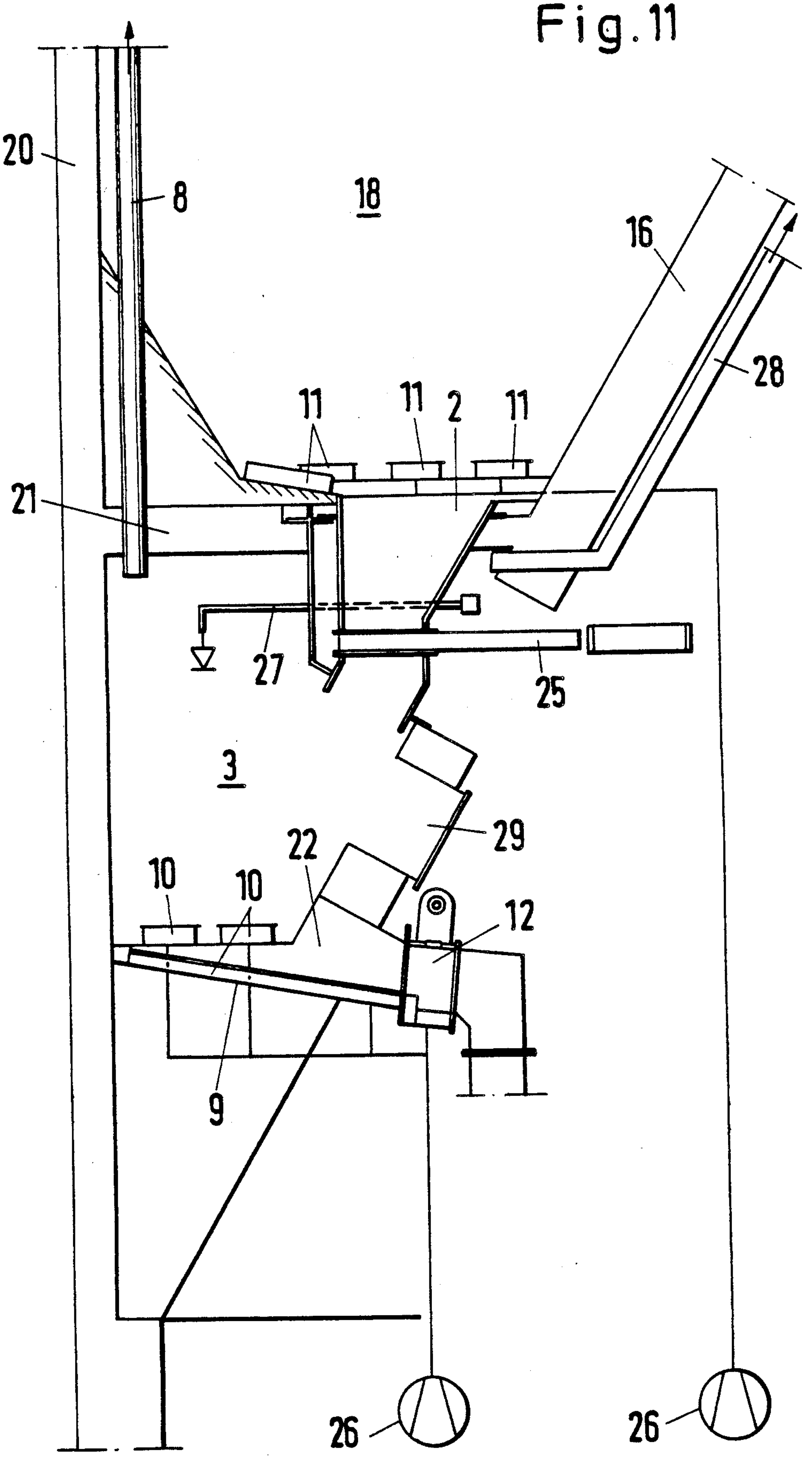
FIG. 11 is a detailed partial view, corresponding to the sectional view of FIG. 10, on a larger scale illustrating the two superimposed silo bases.
Figure 12:
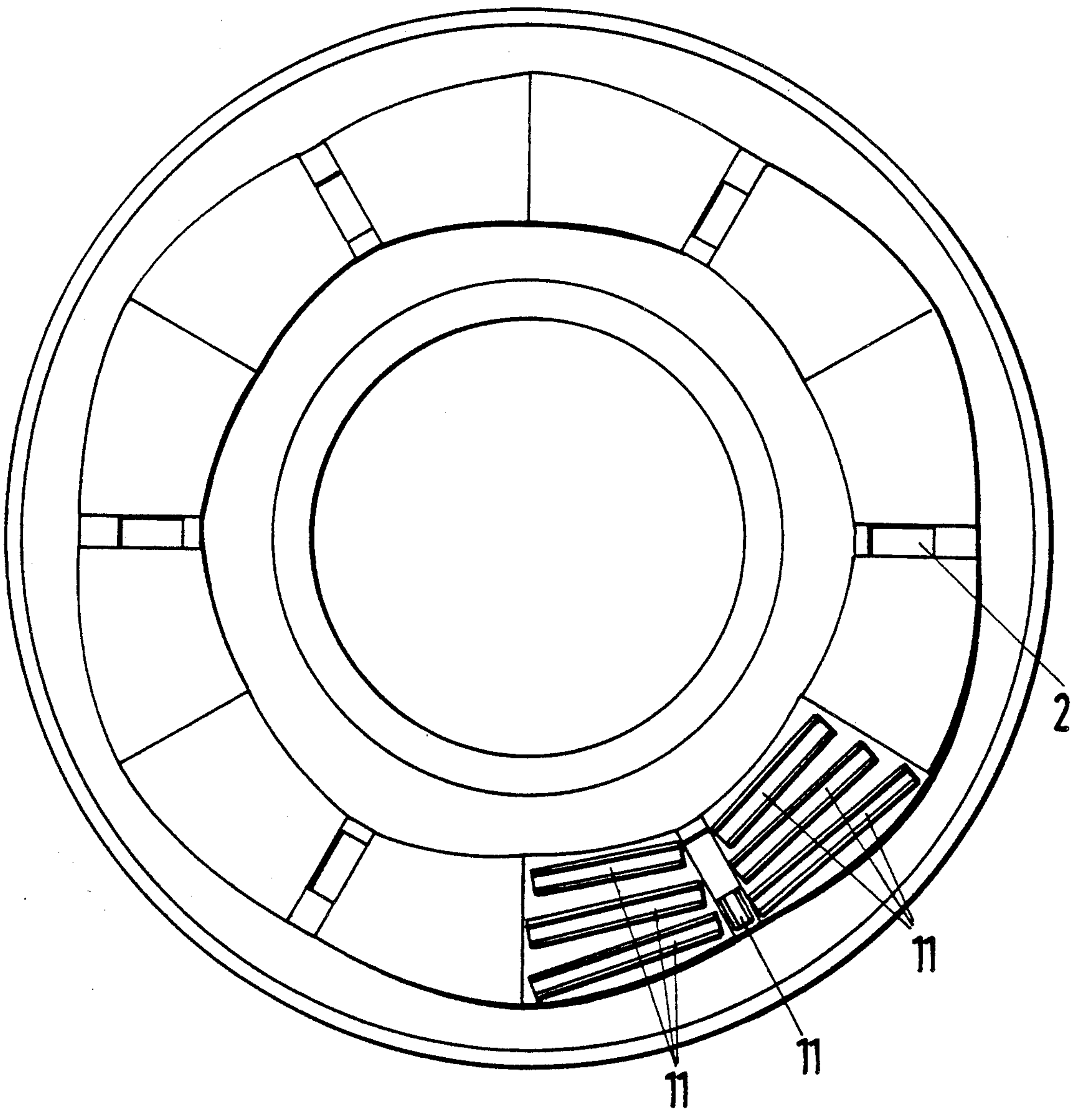
FIG. 12 is a horizontal sectional view of the silo of FIG. 10 taken above the upper silo base.

The embodiment according to FIGS. 10 to 14 comprises the actual silo main area 18 with outer silo wall 20. Above the silo base 9, there is again provided an upper, intermediate base 21, which is also circular and is positioned between the conical cover 16 and the outer silo wall 20. In the upper intermediate base 21, there are provided radially directed slots 2, as best seen in FIG. 12. The material loosening and fluidizing means associated with the slots 2 are formed by air feed troughs 11. Most of the air feed troughs 11 are directed circumferentially and arranged on slopes inclined towards the slots. Smaller air feed troughs 11, however, are directed radially.

Slots 2 can be regulated by shut-off valves 25. The valves 25 can be entirely closed or, if desired, opened to a greater or lesser extent. The actuation of the shut-off valves 25 takes place from the interior of the conical cover. Means for indicating material filling level for the outlet chamber 3 is designated by reference numeral 27 in FIG. 11. Venting means for the outlet chamber 3 comprises either venting lines 8 which are located on the silo outer wall 20, or ventilating lines 28 which pass to the outside through the conical cover 16. Outlet chamber 3 can be viewed and entered through inspection means comprising openings 29 from conical cover 16.

Figure 13:
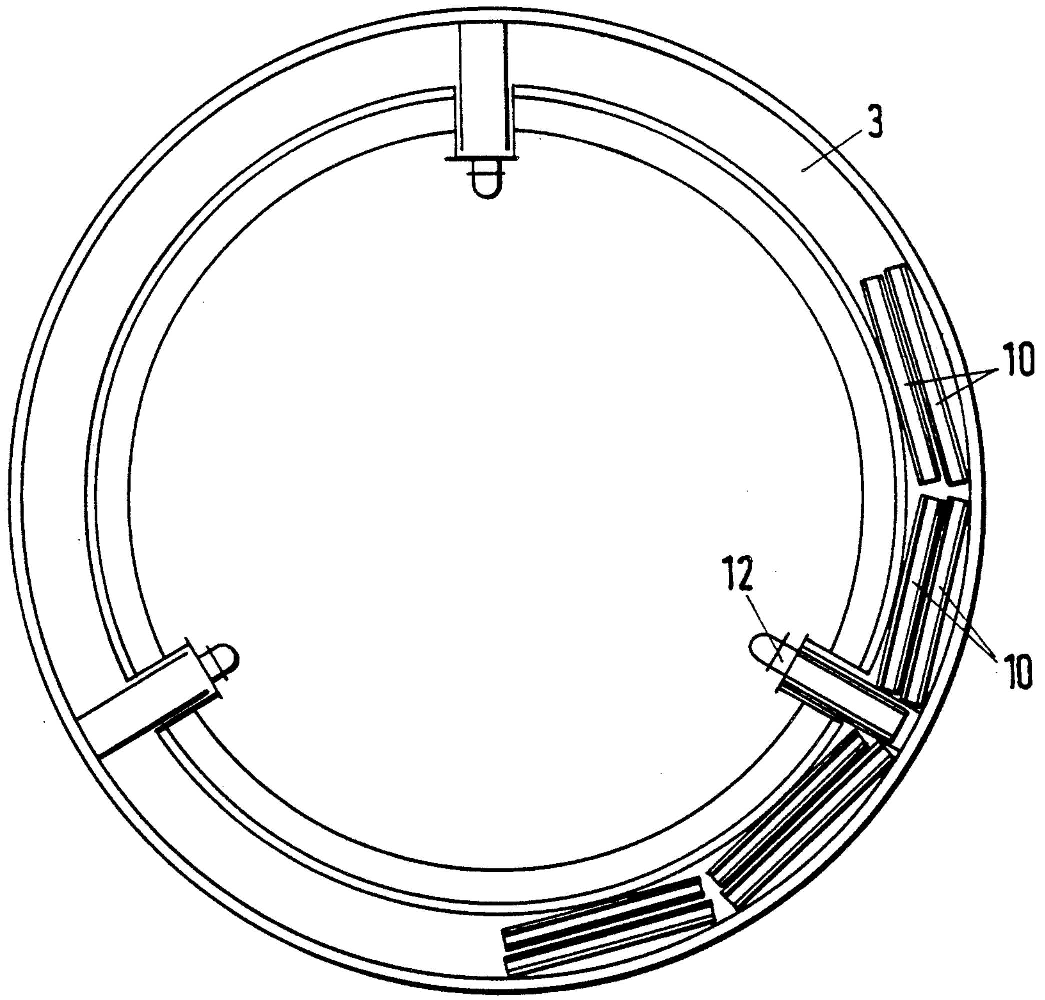
FIG. 13 is a horizontal sectional view of the silo of FIG. 10 above the lower silo base, i.e. through the annular space or chamber between the two silo bases.
Figure 14:
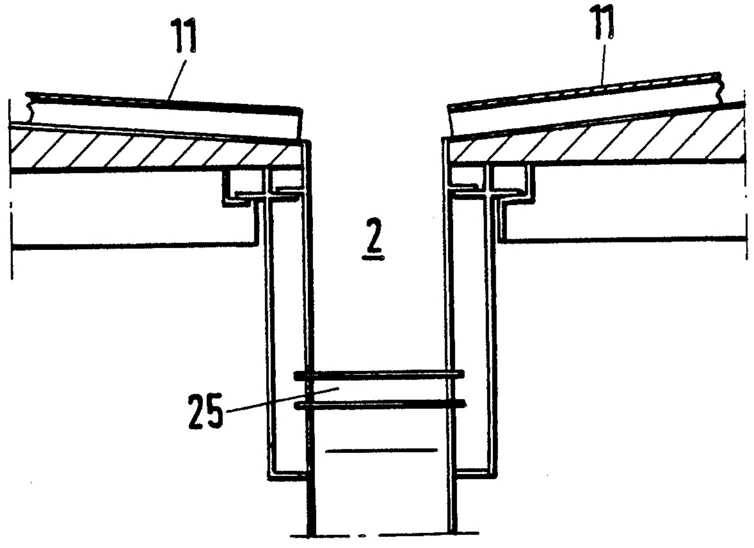
FIG. 14 is a partial cross-sectional view of the silo of FIG. 10 through the upper base illustrating the material discharge area from the silo base.

As best seen from FIG. 13, air feed troughs 10 are provided on the circular silo base 9. The air feed troughs lead the loose material to the outlet openings 22, which can be closed to a greater or lesser extent by regulating, draw-off members 12, so as to ensure a dosed material discharge. As schematically illustrated in FIG. 11, rotary compressors 26 supply compressed air to the air feed troughs 10 and 11.

In accordance with the embodiments shown in FIGS. 10 and 12, there is an upper, intermediate base 21 located above the silo base 9 and as shown in cross-section there are regulatable slots 2 for the entry of material from the silo area 18 into the vented outlet chamber 3 Thus, the outlet chamber 3 forms an annular space below the upper, intermediate base 21, by means of which an improved dosed material discharge from the lower base outlet is possible.

I claim:

1. A silo for pulverulent and other loose materials comprising:
   (a) an outer silo wall;
   (b) a lower circular silo base having an outlet opening for discharging materials from the silo;
   (c) a conical cover in the center of the lower silo base for defining an inner silo wall;
   (d) an upper, intermediate silo base located above the lower circular silo base and between the outer silo wall and conical cover and having a plurality of outlet openings formed therein, wherein an upper silo material storage area is formed above the intermediate silo base and a continuous annular space is formed between the upper and lower silo bases thereby defining a substantially open intermediate material collecting chamber for receiving materials through the plurality of upper base outlet openings from the upper silo storage area and collecting and holding the materials for discharge through the lower base outlet opening; and (e) regulating means for regulating the discharge of loose materials through the lower silo base outlet opening from the intermediate material collecting chamber.

2. The silo of claim 1, wherein the upper silo base outlet openings comprise a plurality of radially arranged slots formed in the upper silo base, and the silo further comprises fluidizing means, associated with the radially arranged slots, for fluidizing materials in the upper silo area for flow through the slots into the collecting chamber, and venting means for ventilating the collecting chamber.

3. The silo of claim 2, further comprising fluidizing means, associated with the lower silo base outlet opening, for fluidizing materials in the collecting chamber for flow through the outlet opening in the lower silo base.

4. The silo of claim 2, further comprising covers for the plurality of slots for allowing lateral flow of materials from the upper silo base area through the slots into the collecting chamber.

5. The silo of claim 2, further comprising means for regulating the openings of the plurality of slots formed in the upper silo base.

6. The silo of claim 4, further comprising means for regulating the openings of the plurality of slots formed in the upper silo base.

7. The silo of claim 6, wherein the regulating means comprises either inhibiting fittings or shut-off valves associated with the radially arranged slots.

8. The silo of claim 2, wherein the fluidizing means are arranged in a circumferential direction of the upper, intermediate silo base adjacent the radially arranged slots.

9. The silo of claim 4, wherein the fluidizing means are arranged in a circumferential direction of the upper, intermediate silo base adjacent the radially arranged slots.

10. The silo of claim 2, wherein the venting means comprises a venting pipe connected to the collecting chamber and passing to the outside along the outer silo wall.

11. The silo of claim 2, wherein the venting means comprises a venting pipe connected to the collecting chamber and passing the outside through the conical cover.

12. The silo of claim 1, wherein the collecting chamber has a volume of 2.5 percent to 5 percent of the total volume of the silo.

13. The silo of claim 2, wherein the collecting chamber has a volume of 2.5 percent to 5 percent of the total volume of the silo.

14. The silo of claim 3, wherein the collecting chamber has a volume of 2.5 percent to 5 percent of the total volume of the silo.

15. The silo of claim 1, further comprising an inspection opening location in either the outer silo wall or conical cover for inspecting the inside of the collecting chamber.

16. The silo of claim 2, further comprising an inspection opening located in either the outer silo wall or conical cover for inspecting the inside of the collecting chamber.

17. The silo of claim 3, further comprising an inspection opening located in either the outer silo wall or conical cover for inspecting the inside of the collecting chamber.

18. A silo for pulverulent and other loose materials comprising:

(a) an outer silo wall;

(b) a lower circular silo base having an outlet opening for discharging materials from the silo;

(c) a conical cover in the center of the lower silo base for defining an inner silo wall;

(d) an upper, intermediate circular silo base located above the lower circular silo base and between the outer silo wall and conical cover and having a plurality of radially arranged outlet slots formed in the upper silo base, wherein an upper silo material storage area is formed above the intermediate silo base and wherein a continuous annular space is formed between the upper and lower silo bases thereby defining a substantially open intermediate material collection chamber for receiving materials in a substantially vertical gravity feed through the upper base outlet slots from the upper silo storage area and collecting and holding the materials for discharge through the lower base outlet opening;

(e) fluidizing means, associated with the radially arranged slots, for fluidizing materials in the upper silo area for flow through the slots into the collecting chamber;

(f) venting means for ventilating the collecting chamber;

(g) fluidizing means, associated with the lower silo base outlet opening, for fluidizing materials in the collecting chamber for flow through the outlet opening in the lower silo base;

(h) means for regulating the openings of the radially arranged slots; and (i) means for regulating the discharge of loose materials through the lower silo base outlet opening from the collecting chamber.

* * * * *